US012680754B2

(12) United States Patent
Zhang et al.

(10) Patent No.: US 12,680,754 B2
(45) Date of Patent: Jul. 14, 2026

(54) MAGNETIC FIELD FRESH-KEEPING APPARATUS AND AIR-COOLED REFRIGERATION DEVICE

(71) Applicants:QINGDAO HAIER REFRIGERATOR CO., LTD., Qingdao (CN); HAIER SMART HOME CO., LTD., Qingdao (CN)

(72) Inventors: Yuning Zhang, Qingdao (CN); Bin Fei, Qingdao (CN); Huihui Liu, Qingdao (CN); Mengcheng Li, Qingdao (CN); Yao Yi, Qingdao (CN); Lisheng Ji, Qingdao (CN); Zilin Cao, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 252 days.

(21) Appl. No.: 18/682,620

(22) PCT Filed: Jun. 22, 2022

(86) PCT No.: PCT/CN2022/100411
§ 371 (c)(1),
(2) Date: Feb. 9, 2024

(87) PCT Pub. No.: WO2023/016096
PCT Pub. Date: Feb. 16, 2023

(65) Prior Publication Data
US 2024/0344753 A1 Oct. 17, 2024

(30) Foreign Application Priority Data

Aug. 11, 2021 (CN) .......................... 202110920584.4

(51) Int. Cl.
*F25D 23/12* (2006.01)
*A23B 2/60* (2025.01)
(Continued)

(52) U.S. Cl.
CPC ........... *F25D 23/12* (2013.01); *F25D 17/042* (2013.01); *A23B 2/60* (2025.01); *F25B 21/00* (2013.01);
(Continued)

(58) Field of Classification Search
None
See application file for complete search history.

(56) References Cited

U.S. PATENT DOCUMENTS 8,127,559 B2 * 3/2012 Fujisaki ................ F25D 17/042
62/3.1
2010/0083687 A1 * 4/2010 Handa ...................... A23B 2/88
700/282
(Continued)

FOREIGN PATENT DOCUMENTS

AU 2020214237 A1 * 8/2021 ............... A23B 2/82
CN 2051060 U * 1/1990
(Continued)

OTHER PUBLICATIONS

CN110074310A_English_Machine_Translation (Year: 2019).*
JP6144068B2_English_Machine_Translation (Year: 2017).*

*Primary Examiner* — Jenna M Maroney
(74) *Attorney, Agent, or Firm* — MUNCY, GEISSLER, OLDS & LOWE, P.C.

(57) ABSTRACT

A magnetic field fresh-keeping apparatus and an air-cooled refrigeration device. The magnetic field fresh-keeping apparatus comprises a drawer container, a drawer, a magnet assembly, and a waterproof structure. The front side of the drawer container has an opening. The drawer is slidably (Continued)

mounted within the drawer container. The magnet assembly comprises a first magnet and a second magnet disposed on opposite sides of the drawer container. The magnet mounting cavity comprises a first mounting cavity for accommodating the first magnet and a second mounting cavity for accommodating the second magnet, and the first mounting cavity and the second mounting cavity are both configured to allow an airflow to pass through so as to cool the first magnet and the second magnet. The waterproof structure is configured to waterproof the magnet assembly.

10 Claims, 7 Drawing Sheets

(51) Int. Cl.
  *F25B 21/00* (2006.01)
  *F25D 9/00* (2006.01)
  *F25D 17/04* (2006.01)
  *F25D 25/02* (2006.01)

(52) U.S. Cl.
  CPC .............. *F25D 9/00* (2013.01); *F25D 25/025* (2013.01); *F25D 2201/10* (2013.01); *F25D 2321/1441* (2013.01)

(56) References Cited

U.S. PATENT DOCUMENTS

| | | | | |
|---|---|---|---|---|
| 2013/0160467 | A1 * | 6/2013 | Hall | F25D 31/005 |
| | | | | 62/3.1 |
| 2021/0190391 | A1 * | 6/2021 | Kayano | F25B 21/00 |
| 2024/0361047 | A1 * | 10/2024 | Zhang | F25D 17/08 |
| 2025/0020386 | A1 * | 1/2025 | Zhang | F25D 25/025 |

FOREIGN PATENT DOCUMENTS

| | | | | | |
|---|---|---|---|---|---|
| CN | 1500441 | A | | 6/2004 | |
| CN | 102066858 | A | * | 5/2011 | ............ F25D 21/04 |
| CN | 205403318 | U | | 7/2016 | |
| CN | 206427503 | U | | 8/2017 | |
| CN | 109028745 | A | | 12/2018 | |
| CN | 110074310 | A | * | 8/2019 | ............... A23B 2/80 |
| CN | 110108076 | A | | 8/2019 | |
| CN | 209893723 | U | | 1/2020 | |
| CN | 111503984 | A | | 8/2020 | |
| CN | 112013619 | A | | 12/2020 | |
| CN | 112207948 | A | | 1/2021 | |
| CN | 212401919 | U | | 1/2021 | |
| CN | 212401920 | U | | 1/2021 | |
| CN | 212409195 | U | | 1/2021 | |
| CN | 214536999 | U | * | 10/2021 | |
| CN | 216114894 | U | | 3/2022 | |
| CN | 114688798 | A | * | 7/2022 | ............ F25D 25/02 |
| CN | 115704630 | A | * | 2/2023 | |
| DE | 1467785 | A1 | * | 12/1968 | |
| JP | H02123001 | A | | 5/1990 | |
| JP | 09296830 | A | | 11/1997 | |
| JP | 2713440 | B2 | * | 2/1998 | |
| JP | 10202266 | A | | 8/1998 | |
| JP | 2001248952 | A | * | 9/2001 | |
| JP | 2003139460 | A | | 5/2003 | |
| JP | 2004081133 | A | * | 3/2004 | |
| JP | 2005061729 | A | | 3/2005 | |
| JP | 3689300 | B2 | * | 8/2005 | |
| JP | 2008215716 | A | * | 9/2008 | |
| JP | 6144068 | B2 | | 6/2017 | |
| KR | 101768724 | B1 | * | 8/2017 | .......... F25D 25/025 |
| WO | 2008153285 | A2 | | 12/2008 | |
| WO | WO 2020108617 | A1 | | 6/2020 | |
| WO | 2021070619 | A1 | | 4/2021 | |
| WO | WO-2023016148 | A1 | * | 2/2023 | ............ F25D 11/02 |
| WO | WO-2023016225 | A1 | * | 2/2023 | ............ F25D 23/00 |

* cited by examiner

100

200

242

200

MAGNETIC FIELD FRESH-KEEPING APPARATUS AND AIR-COOLED REFRIGERATION DEVICE

TECHNICAL FIELD

The present invention belongs to the technical field of freshness-preservation apparatuses, and more particularly provides a magnetic field fresh-keeping apparatus and an air-cooled refrigeration device.

BACKGROUND ART

Theoretical studies have found that the magnetic field has a great influence on the formation of ice crystals in a refrigeration process, and can reduce a freezing temperature of food varieties.

To achieve the purpose of preserving the freshness for food varieties at low temperature without freezing, some manufacturers now provide refrigeration apparatuses (for example, refrigerators) with electromagnetic coils to provide magnetic fields for food varieties in the refrigeration apparatuses by means of the electromagnetic coils.

However, if external water or moisture enters to the electromagnetic coils and cannot be discharged in time, the electromagnetic coils will be corroded to cause short-circuiting between the electromagnetic coils and other structures, which reduces the usability of the electromagnetic coils.

SUMMARY OF THE INVENTION

An object of the present invention is to provide a novel magnetic field fresh-keeping apparatus to prevent magnets from being corroded by water, thereby ensuring the usability of electromagnetic coils.

Another object of the present invention is to improve a magnetic field-based freshness-preservation performance of the magnetic field fresh-keeping apparatus.

Another object of the present invention is to endow the magnetic field fresh-keeping apparatus with a magnetic field having uniform intensity.

In particular, the present invention is directed to a magnetic field fresh-keeping apparatus, comprising:

a drawer container, having an opening formed in a front side thereof;

a drawer, installed slidably into the drawer container;

a magnet assembly, comprising a first magnet and a second magnet, which are disposed on two opposite sides of the drawer container;

a magnet mounting cavity, comprising a first mounting cavity for arrangement of the first magnet and a second mounting cavity for arrangement of the second magnet, the first and second installation cavities both being disposed to allow passage of an airflow to cool the first and second magnets; and a waterproof structure for protecting the magnet assembly from water.

Further, the first and second magnets are each an electromagnetic coil; and the waterproof structure comprises a waterproof layer covering the electromagnetic coils.

Further, the electromagnetic coils are each a coil made of a wound enameled wire.

Further, the first and second magnets are each an electromagnetic coil;

a bottom wall of the first mounting cavity is provided with a first wire outlet, through which a lead of the first magnet passes and which allows outflow of a liquid from the first mounting cavity; and a bottom wall of the second mounting cavity is provided with a second wire outlet, through which a lead of the second magnet passes and which allows outflow of a liquid from the second mounting cavity.

Further, a first annular groove is formed in the first mounting cavity, the first magnet is installed in the first annular groove, and the first wire outlet is formed in a corner of the first annular groove; and/or a second annular groove is formed in the second mounting cavity, the second magnet is installed in the second annular groove, and the second wire outlet is disposed at a corner of the second annular groove.

Further, a first air inlet of the first mounting cavity is formed in a corner of the first annular groove opposite to the first wire outlet; and/or a second air inlet of the second mounting cavity is formed in a corner of the second annular groove opposite to the second wire outlet; and/or an included angle between each of the first and second wire outlets and a horizontal plane has a value in a range of 0° to 45°.

Further, the magnetic field fresh-keeping apparatus further comprises:

a thermal insulation plate, provided on a bottom side of the drawer container, wherein the thermal insulation plate is provided with a water drain, and a height throughout the thermal insulation plate gradually decreases towards the water drain; and the thermal insulation plate is configured to receive a liquid discharged from each of the first and second wire outlets.

Further, the magnetic field fresh-keeping apparatus further comprises:

a water receiving container, disposed below the drawer container, wherein the water receiving container is configured to receive a liquid falling from the water drain.

Further, the magnetic field fresh-keeping apparatus comprises:

a top cover plate, disposed on a top side of the drawer container, the first mounting cavity being formed between the top cover plate and a top wall of the drawer container; and a bottom cover plate, disposed on a bottom side of the drawer container, the second mounting cavity being formed between the bottom cover plate and a bottom wall of the drawer container; and/or, the magnet assembly further comprises:

a first magnetically conductive member, installed in the first mounting cavity and configured to prevent leakage of a magnetic field generated by the first magnet, a second magnetically conductive member, installed in the second mounting cavity and configured to prevent leakage of a magnetic field generated by the second magnet, and a magnetically conductive connecting member, disposed between the first magnetically conductive member and the second magnetically conductive member, the magnetically conductive connecting member being connected to the first magnetically conductive member and the second magnetically conductive member, respectively.

The present invention is also directed to an air-cooled refrigeration device comprising the magnetic field fresh-keeping apparatus, wherein the air-cooled refrigeration device can provide cold-blast air to the magnetic field fresh-keeping apparatus.

Based on the foregoing description, those skilled in the art can understand that in the foregoing technical solution of the present invention, magnets are prevented from contacting water or moisture by the arrangement of a waterproof structure for a magnet assembly, thereby avoiding magnet corrosion caused by water and ensuring the usability of the electromagnetic coils.

Further, the electromagnetic coils are each made of a wound enameled wire and externally covered with a waterproof layer, such that the electromagnetic coils achieve a better waterproof performance due to a double-layer waterproof structure. Meanwhile, the coils made of the wound enameled wires have a compact structure, such that a first magnet and a second magnet each have a smaller volume and footprint.

Further, a first wire outlet may allow the passage of a lead of the first magnet as well as the outflow of a liquid from a first mounting cavity to achieve dual purposes, such that a separate water drain is avoided, making the structure of the magnetic field fresh-keeping apparatus more compact.

Further, a first air inlet and the first wire outlet are respectively formed in two opposite corners of a first annular groove, and a second air inlet and the second wire outlet are respectively formed in two opposite corners of a second annular groove, such that an airflow can blow water or moisture in the first and second annular grooves towards the first and second wire outlets under the restriction of the first and second annular grooves, allowing quick discharge of the water or moisture from the first and second annular grooves.

Further, a first magnetically conductive member is disposed in the first mounting cavity, such that the first magnet is prevented from leakage of a magnetic field by means of the first magnetically conductive member; and a second magnetically conductive member is disposed in a second mounting cavity, such that the second magnet is prevented from leakage of a magnetic field by means of the second magnetically conductive member, thereby improving a utilization rate of the magnetic fields. Meanwhile, the first and second magnetically conductive members may also allow uniform intensity of the magnetic fields in a drawer container, providing a good environment for freshness-preservation of objects stored in a drawer.

The above and other objects, advantages and features of the present invention will become more apparent to those skilled in the art from the following detailed description of specific embodiments thereof taken in conjunction with the accompanying drawings.

BRIEF DESCRIPTION OF THE DRAWINGS

Some specific embodiments of the invention will be described in detail hereinafter by way of example and not by way of limitation with reference to the accompanying drawings. The same reference numerals identify the same or similar components or parts in the drawings. Those skilled in the art should appreciate that the drawings are not necessarily drawn to scale. In the drawings.

DETAILED DESCRIPTION

Figure 1:
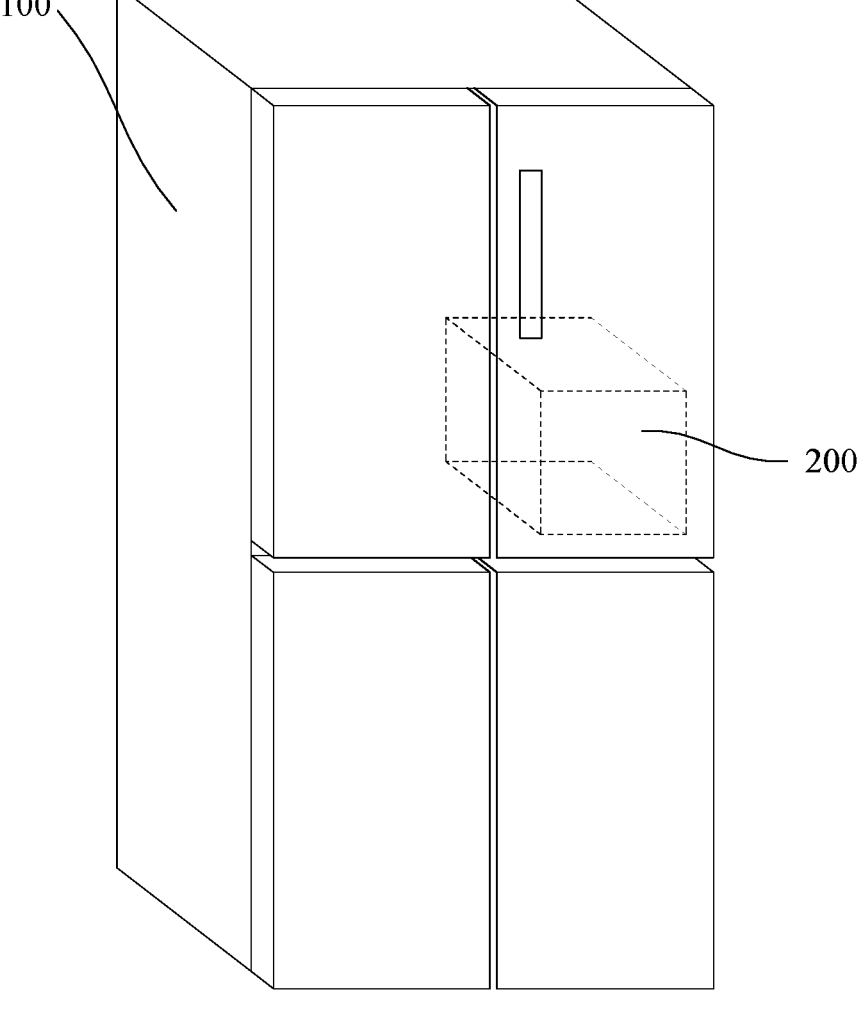
FIG. 1 is a schematic effect diagram of an air-cooled refrigeration device according to some embodiments of the present invention.

Those skilled in the art should understand that the embodiments described below are only a part of embodiments of the present invention rather than all embodiments of the present invention. This part of embodiments is intended to explain the technical principle of the present invention rather than to restrict the protection scope thereof. All other embodiments achieved by those of ordinary skills in the art, based on the embodiments of the present invention without creative work, shall fall within the protection scope of the present invention.

In the description of the present invention, it should be understood that, orientation or position relationships indicated by the terms "center", "upper", "lower", "top", "bottom", "left", "right", "vertical", "horizontal", "inner", "outer" etc. are based on the orientation or position relationships shown in the drawings, for ease of the description of the present invention rather than indicating or implying that the indicated device or element must have a particular orientation or be constructed and operated in a particular orientation. Therefore, these terms should not be understood as limitations to the present invention. In addition, the terms such as "first", "second" and "third" are merely for a descriptive purpose, and cannot be understood as indicating or implying relative importance.

Further, in the description of the present invention, unless otherwise explicitly defined or limited, the terms "install", "connected with", "connected to" should be comprehended in a broad sense. For example, they may refer to a fixed connection, detachable connection or integrated connection, or may be a mechanical connection or electrical connection, or may refer to a direct connection or an indirect connection via an intermediary, or may be an internal communication of two elements. The specific meanings about the foregoing terms in the present invention may be understood by those skilled in the art according to specific circumstances.

FIG. 1 is a schematic effect diagram of an air-cooled refrigeration device according to some embodiments of the present invention. The air-cooled refrigeration device includes a box body 100 and a magnetic field fresh-keeping apparatus 200. The magnetic field fresh-keeping apparatus 200 is installed on the box body 100 and configured for storage and freshness-preservation of stored objects (including food varieties, pharmaceutical products, alcoholic beverage, biological reagents, bacterial colonies, chemical reagents, or the like).

In the present invention, the air-cooled refrigeration device includes a refrigerator, a freezer and a cooler.

Figure 2:
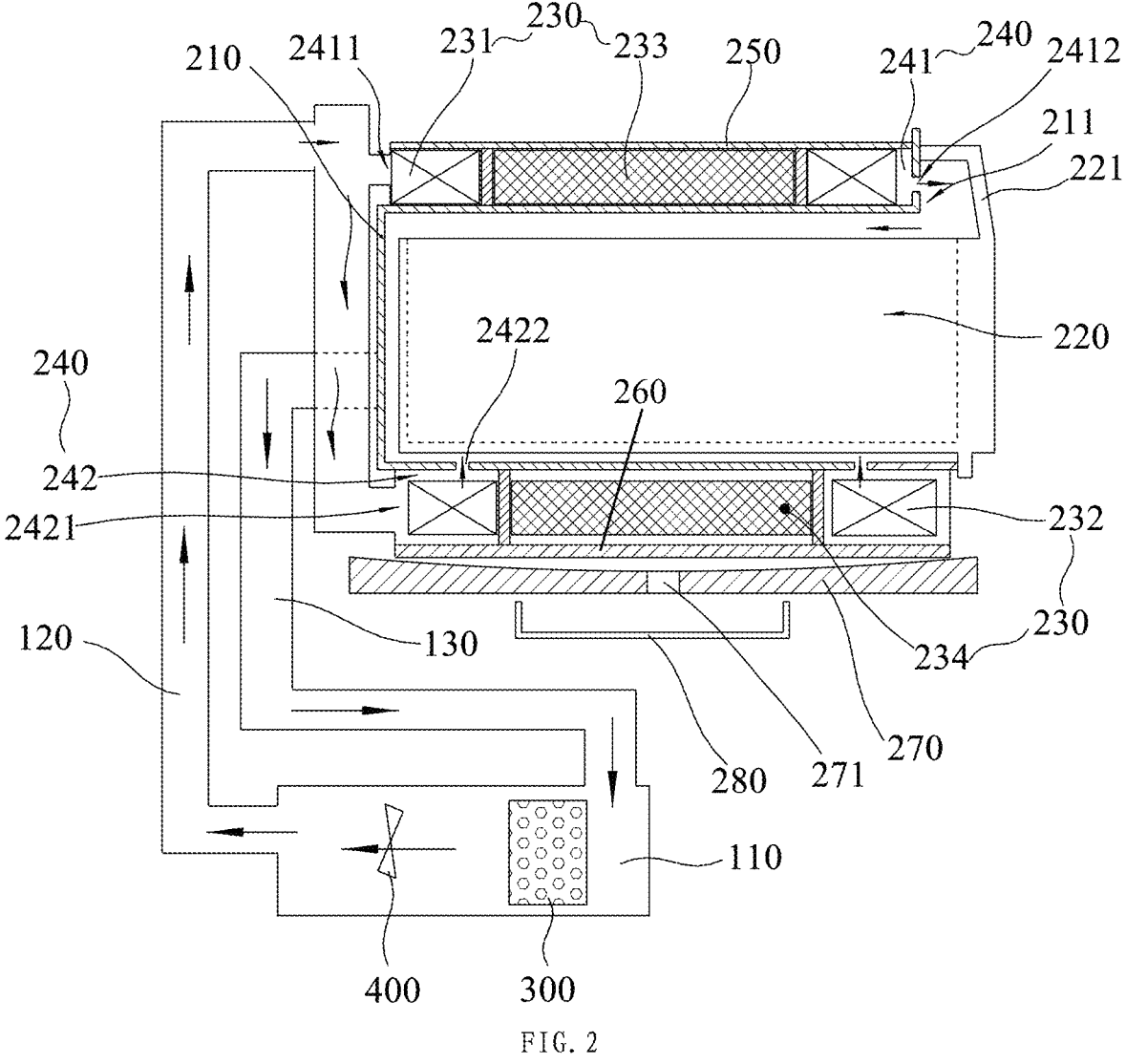
FIG. 2 is a schematic diagram showing a principle of a magnetic field fresh-keeping apparatus according to some embodiments of the present invention.

FIG. 2 is a schematic diagram showing a principle of a magnetic field fresh-keeping apparatus 200 according to some embodiments of the present invention.

As shown in FIG. 2, in some embodiments of the present invention, the box body 100 includes a refrigeration compartment 110, an air supply channel 120, an air return channel 130, and a storage compartment (not shown). The refrigeration compartment 110 and the storage compartment are communicated with each other by means of the air supply channel 120 and the air return channel 130 to circulate air between the refrigeration compartment 110 and the storage compartment. The magnetic field fresh-keeping apparatus 200 is arranged in the storage compartment.

Further, in some embodiments of the present invention, one or more storage compartments may be provided. In case of a plurality of storage compartments, some of the storage compartments are refrigeration compartments, some of the storage compartments are temperature-variable compartments, and some of the storage compartments are freezing compartments. At least one magnetic field fresh-keeping apparatus 200 is arranged in each of the temperature-variable compartments and/or the freezing compartments.

Still referring to FIG. 2, in some embodiments of the present invention, the air-cooled refrigeration device further includes an evaporator 300 and a fan 400, with the evaporator 300 arranged in the refrigeration compartment 110 for cooling the air in the refrigeration compartment 110. The fan 400 is configured to drive the air to circulate successively in the refrigeration compartment 110, the air supply channel 120, the storage compartment and the air return channel 130.

Still referring to FIG. 2, in some embodiments of the present invention, the magnetic field fresh-keeping apparatus 200 includes a drawer container 210, a drawer 220, a magnet assembly 230, a magnet mounting cavity 240, a top cover plate 250, a bottom cover plate 260, a thermal insulation plate 270, and a water receiving container 280.

The drawer 220 is installed slidably into the drawer container 210 and configured to store stored objects. The magnet assembly 230 is configured to provide a magnetic field to the stored objects in the drawer 220. The magnet mounting cavity 240 is configured for installation of the magnet assembly 230. A portion of the magnet mounting cavity 240 is formed between the top cover plate 250 and the top wall of the drawer container 210, and a portion of the magnet mounting cavity 240 is also formed between the bottom cover plate 260 and the top wall of the drawer container 210. The thermal insulation plate 270 is disposed on the bottom side of the drawer container 210. The water receiving container 280 is configured to hold and receive a liquid (including condensate, juice of the stored objects or the like).

Figure 3:
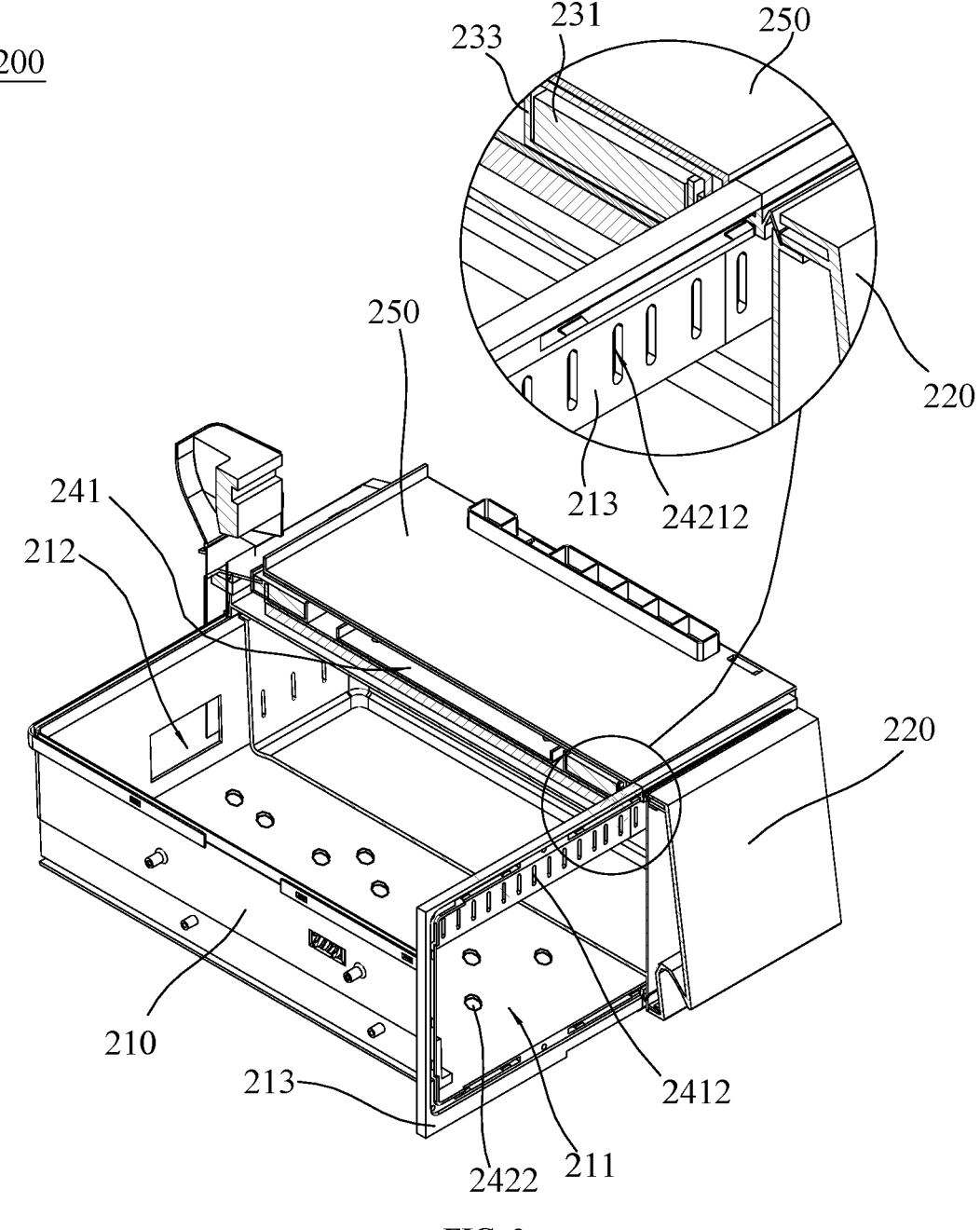
FIG. 3 is an isometric side sectional view of a magnetic field fresh-keeping apparatus according to some embodiments of the present invention.

FIG. 3 is an isometric side sectional view of a magnetic field fresh-keeping apparatus 200 according to some embodiments of the present invention.

As shown in FIG. 2 and FIG. 3, the front side of the drawer container 210 is provided with an opening 211, which allows insertion of the drawer 220 into the drawer container 210, thereby enabling the drawer 220 to be slidably installed into the drawer container 210. The rear side of the drawer container 210 is further provided with an air return port 212, which is communicated with the air return channel 130 to introduce the air in the drawer container 210 into the air return channel 130. Furthermore, those skilled in the art may arrange the air return port 212 on the left, right, lower or upper side of the drawer container 210, as required.

As shown in FIG. 2 and FIG. 3, the drawer 220 has a front end cover 221, which, when the drawer 220 slides into the drawer container 210, is butted against a frame body 213 at a front end of the drawer container 210, and a gap is provided between the front end cover 221 and the frame body 213 at the front end of the drawer container 210.

Figure 4:
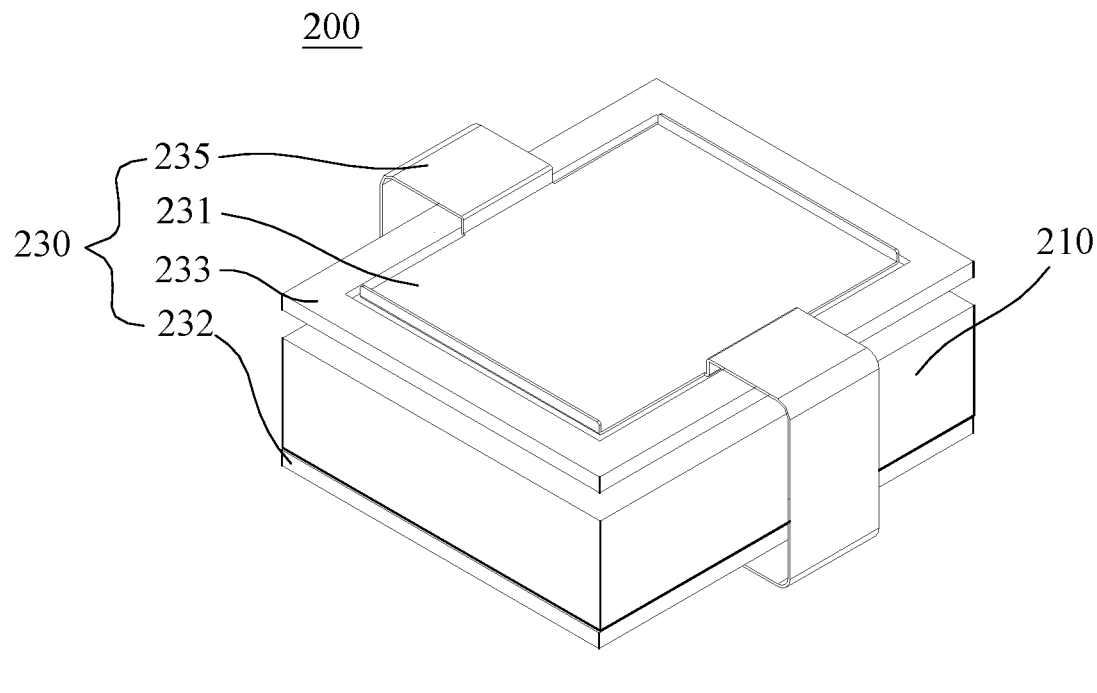
FIG. 4 is a schematic effect diagram of a magnetic field fresh-keeping apparatus according to some embodiments of the present invention.
Figure 5:
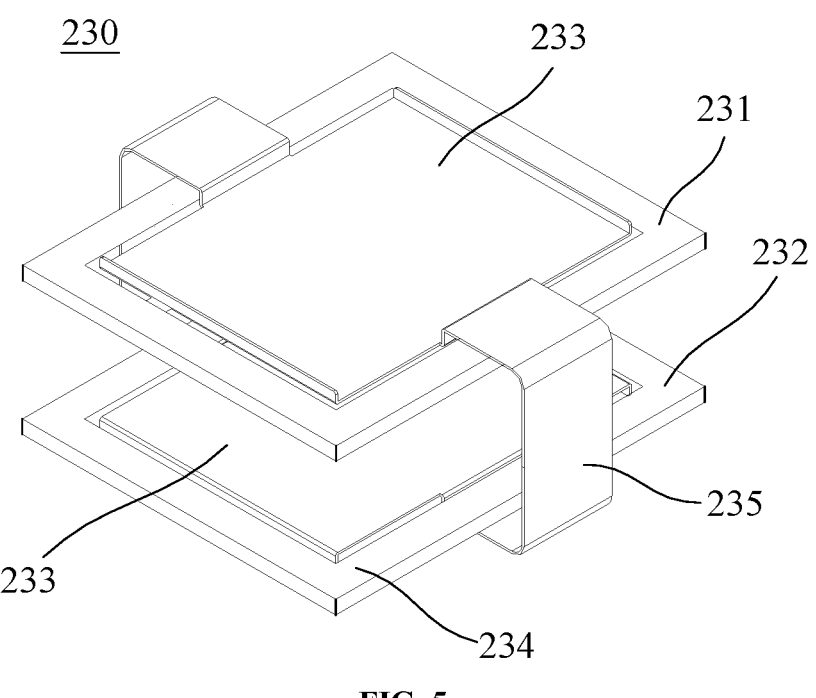
FIG. 5 is an axonometric view of a magnet assembly in FIG. 4.

FIG. 4 is a schematic effect diagram of a magnetic field fresh-keeping apparatus 200 according to some embodiments of the present invention; and FIG. 5 is an axonometric view of a magnet assembly 230 in FIG. 4.

As shown in FIG. 4 and FIG. 5, the magnet assembly 230 is disposed on the outer side of the drawer container 210 to facilitate the fixing and wiring of the magnet assembly 230. Without doubt, those skilled in the art may also dispose the magnet assembly 230 on the inner side of the drawer container 210, as required.

As shown in FIG. 4 and FIG. 5, the magnet assembly 230 includes a first magnet 231 and a second magnet 232, which are disposed on two opposite sides of the drawer container 210. Preferably, the first and second magnets 231 and 232 are aligned with each other. Further preferably, the first and second magnets 231 and 232 are disposed on the top and bottom sides of the drawer container 210, respectively. In addition, those skilled in the art may also dispose the first and second magnets 231 and 232 on the left and right sides of the drawer container 210, respectively, as required.

Still referring to FIG. 4 and FIG. 5, the magnet assembly 230 optionally further includes a first magnetically conductive member 233, a second magnetically conductive member 234, and a magnetically conductive connecting member 235. The first magnetically conductive member 233 corresponds to the first magnet 231, the second magnetically conductive member 234 corresponds to the second magnet 232, and the magnetically conductive connecting member 235 connects the first and the second magnetically conductive members 233 and 234 together.

In the present invention, the first magnetically conductive member 233, the second magnetically conductive member 234, and the magnetically conductive connecting member 235 are configured to prevent the leakage of the magnetic fields of the first and second magnets 231 and 232, i.e., to confine the magnetic fields generated by the first and second magnets 231 and 232. Specifically, the magnetic fields generated by the first and second magnets 231 and 232 are confined inside the drawer container 210, such that the magnetic fields can be applied to the stored objects in the drawer 220 as much as possible. Therefore, the present invention improves the utilization rate of the magnetic fields of the first and second magnets 231 and 232 by providing the first magnetically conductive member 233, the second magnetically conductive member 234 and the magnetically conductive connecting member 235.

Preferably, horizontal projections of the first magnetically conductive member 233 and the first magnet 231 can jointly cover the stored objects in the drawer 220, and horizontal projections of the second magnetically conductive member 234 and the second magnet 232 can also jointly cover the stored objects in the drawer 220, such that the magnetic fields can act on the stored objects in the drawer 220.

Further, the first magnetically conductive member 233, the second magnetically conductive member 234 and the magnetically conductive connecting member 235 can also allow more uniform distribution of the intensity of the magnetic fields, such that the first and second magnets 231 and 232 provide a good magnetic field-based freshness-preservation environment for the stored objects in the drawer 220.

It should be noted that the first magnetically conductive member 233, the second magnetically conductive member 234 and the magnetically conductive connecting member 235 each may be any feasible magnetically conductive member, for example, a silicon steel sheet.

In some embodiments of the present invention, the first and second magnets 231 and 232 of the present invention are optionally each an electromagnetic coil. Further optionally, the first and second magnets 231 and 232 are each a coil made of a wound enameled wire. It can be understood by those skilled in the art that, with respect to wires covered with other insulation layers, the enameled wire has a smaller diameter, making the volume of the electromagnetic coil smaller.

Figure 6:
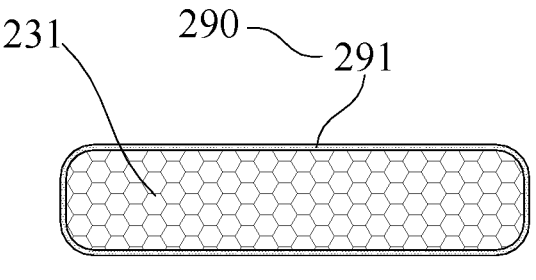
FIG. 6 is a schematic effect diagram of an electromagnetic coil covered with a waterproof layer according to some embodiments of the present invention.

FIG. 6 is a schematic effect diagram of an electromagnetic coil covered with a waterproof layer according to some embodiments of the present invention.

As shown in FIG. 6, the magnetic field fresh-keeping apparatus 200 further includes a waterproof structure 290 configured to protect the magnet assembly 230 from water. Specifically, the waterproof structure 290 includes a waterproof layer 291 covering each of the electromagnetic coils (the first and second magnets 231 and 232). Optionally, the waterproof layer 291 may cover each of the first and second magnets 231 and 232 by dipping, plastic sealing, spraying or other means.

Further, coating enamel of the first and second magnets 231 and 232 is a waterproof paint to stop water at the outer side of the coating enamel and prevent water from coming into contact with the coating enamel, thereby allowing the coating enamel of the first and second magnets 231 and 232 to also act as part of the waterproof structure 290.

Returning and still referring to FIG. 2 and FIG. 3, the magnet mounting cavity 240 includes a first mounting cavity 241 and a second mounting cavity 242. The first mounting cavity 241 is configured for arrangement of the first magnet 231 and the first magnetically conductive member 233, and the second mounting cavity 242 is configured for arrangement of the second magnet 232 and the second magnetically conductive member 234. The first and second installation cavities 241 and 242 are each configured to allow passage of an airflow to cool at least the first and second magnets 231 and 232.

Further, the first mounting cavity 241 is formed between the top cover plate 250 and the top wall of the drawer container 210. Preferably, the first mounting cavity 241 is defined by the top cover plate 250 and the top wall of the drawer container 210 together. The second mounting cavity 242 is formed between the bottom cover plate 260 and the bottom wall of the drawer container 210. Preferably, the second mounting cavity 242 is defined by the bottom cover plate 260 and the top wall of the drawer container 210 together.

Still referring to FIG. 2 and FIG. 3, the first mounting cavity 241 has a first air inlet 2411 and a first air outlet 2412. The first mounting cavity 241 is communicated with the air supply channel 120 by means of the first air inlet 2411, and the first mounting cavity 241 is communicated with the drawer container 210 by means of the first air outlet 2412. Specifically, the first air outlet 2412 is aligned with the front end cover 221 of the drawer 220, such that the first mounting cavity 241 blows cold-blast air towards the front end cover 221 to thus allow the cold-blast air to return to the interior of the drawer 220. Further specifically, the first air outlet 2412 is formed in a frame body 213 at a front end of the drawer container 210.

Still referring to FIG. 2 and FIG. 3, the second mounting cavity 242 has a second air inlet 2421 and a second air outlet 2422. The second mounting cavity 242 is communicated with the air supply channel 120 by means of the second air inlet 2421, and the second mounting cavity 242 is communicated with the drawer container 210 by means of the second air outlet 2422. Specifically, the second air outlet 2422 is formed in the bottom wall of the drawer container 210. The second mounting cavity 242 blows the cold-blast air to the bottom wall of the drawer 220 by means of its second air outlet 2422.

Based on the foregoing description, it can be understood by those skilled in the art that the magnetic field fresh-keeping apparatus 200 of the present invention can prevent the cold-blast air from blowing directly on the stored objects in the drawer 220, thereby avoiding the freezing of the stored objects. Meanwhile, due to the arrangement of the magnet member 230, the magnetic fields generated by the magnet assembly 230 can have a greater impact on the formation of ice crystals in a freezing process, and reduce the freezing temperature of the stored objects. This allows the stored objects to be stored at a lower temperature without freezing. Therefore, the air-cooled refrigeration device and the magnetic field fresh-keeping apparatus 200 of the present invention can effectively prevent the stored objects from being frozen.

Figure 7:
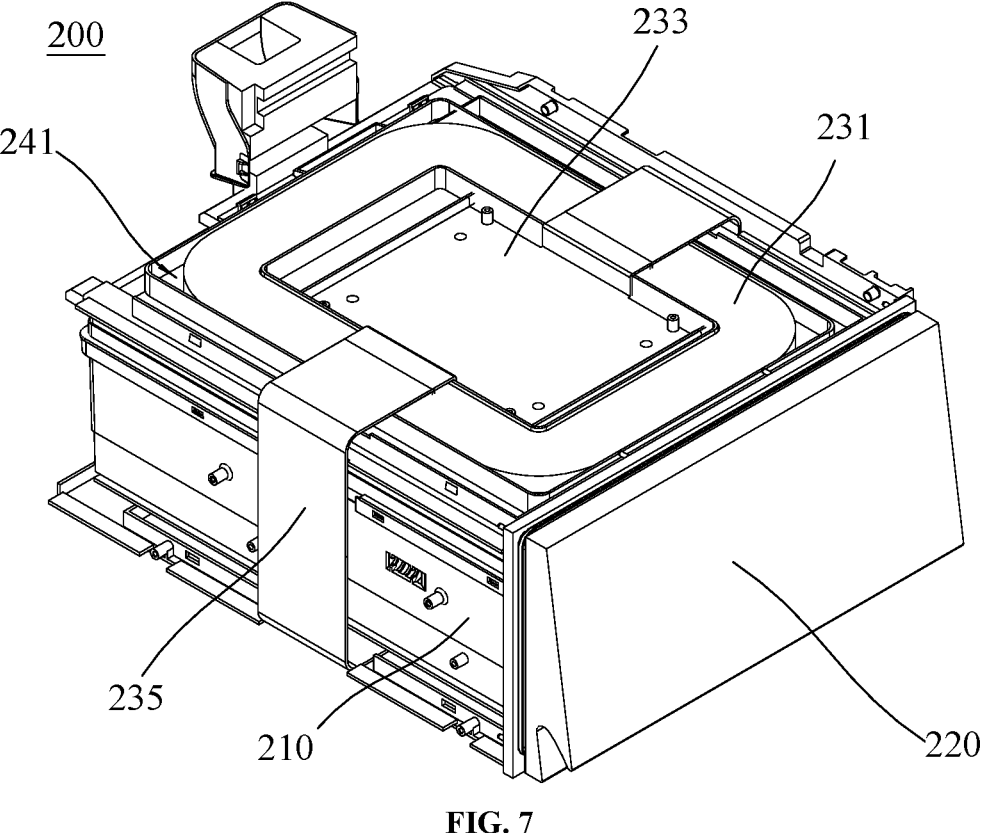
FIG. 7 is an upper-front axonometric view of a magnetic field fresh-keeping apparatus according to some embodiments of the present invention (with a top cover plate omitted)
Figure 8:
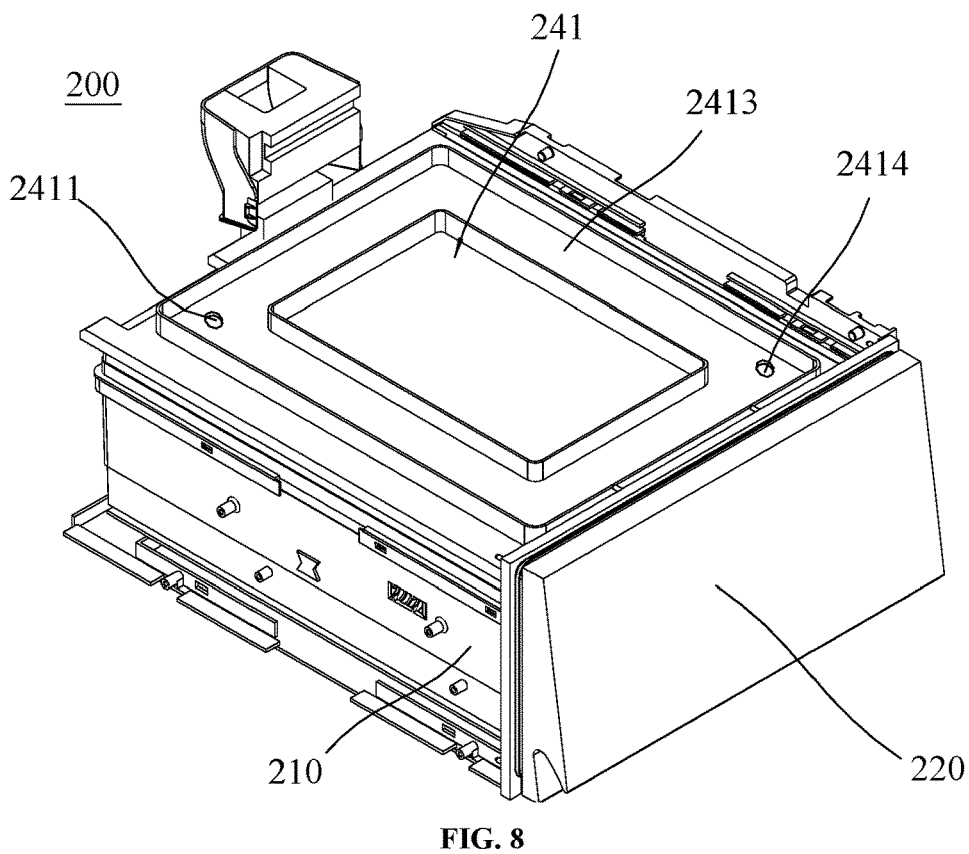
FIG. 8 is an upper-front axonometric view of a magnetic field fresh-keeping apparatus according to some embodiments of the present invention (with the top cover plate and the magnet assembly omitted)
Figure 9:
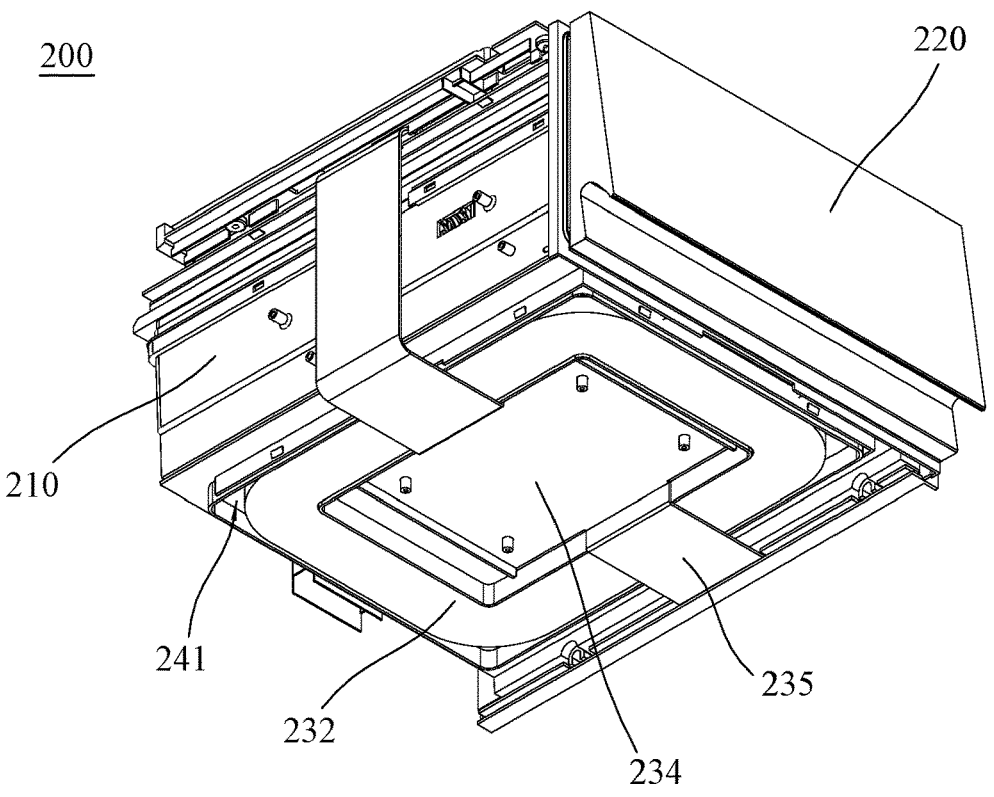
FIG. 9 is a lower-front axonometric view of a magnetic field fresh-keeping apparatus according to some embodiments of the present invention (with a bottom cover plate omitted)
Figure 10:
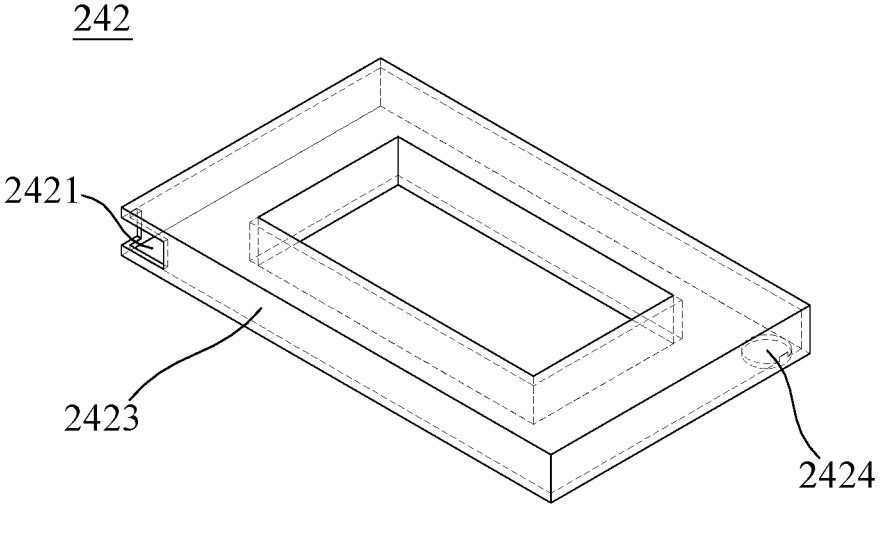
FIG. 10 is a schematic effect diagram of a second mounting cavity according to some embodiments of the present invention.
Figure 11:
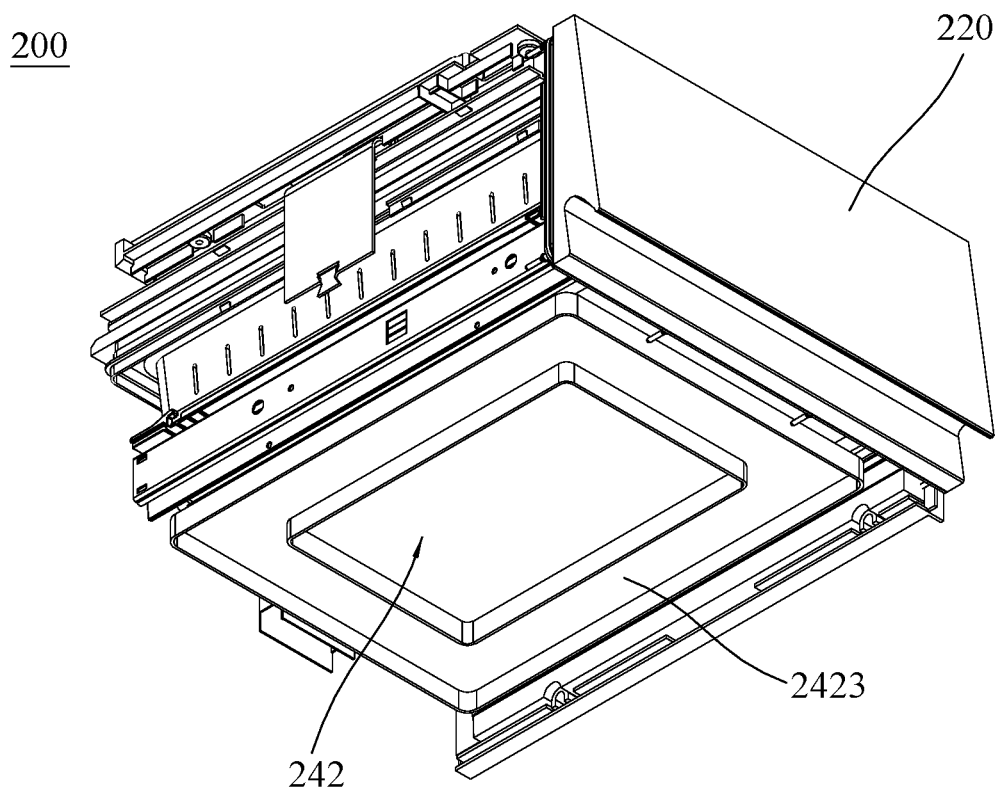
FIG. 11 is a lower-front axonometric view of a magnetic field fresh-keeping apparatus according to some embodiments of the present invention (with the bottom cover plate and the magnet assembly omitted).

FIG. 7 is an upper-front axonometric view of a magnetic field fresh-keeping apparatus 200 according to some embodiments of the present invention (with a top cover plate omitted); FIG. 8 is an upper-front axonometric view of a magnetic field fresh-keeping apparatus 200 according to some embodiments of the present invention (with the top cover plate and the magnet assembly omitted); FIG. 9 is a lower-front axonometric view of a magnetic field fresh-keeping apparatus 200 according to some embodiments of the present invention (with a bottom cover plate omitted); FIG. 10 is a schematic effect diagram of a second mounting cavity according to some embodiments of the present invention; and FIG. 11 is a lower-front axonometric view of a magnetic field fresh-keeping apparatus 200 according to some embodiments of the present invention (with the bottom cover plate and the magnet assembly omitted).

As shown in FIG. 7 to FIG. 11, a first annular groove 2413 is formed in the first mounting cavity 241, in which the first magnet 231 is installed. A second annular groove 2323 is formed in the second mounting cavity 242, in which the second magnet 232 is installed.

As show in FIG. 8, a bottom wall of the first mounting cavity 241 is provided with a first wire outlet 2414, through which a lead of the first magnet 231 passes and which allows outflow of a liquid from the first mounting cavity 241.

Preferably, a first wire outlet 2414 is formed in a corner of the first annular groove 2413. Further preferably, the first air inlet 2411 is formed in a corner of the side wall of the first annular groove 2413 opposite to the first wire outlet 2414. Optionally, the first wire outlet 2414 is also communicated with the drawer container 210.

On the basis that the first wire outlet 2414 is also communicated with the drawer container 210, those skilled in the art may also omit the arrangement of the first air outlet 2412 as required, such that air in the first mounting cavity 241 enters the drawer container 210 by means of the first wire outlet 2414.

As shown in FIG. 10, a bottom wall of the second mounting cavity 242 is provided with a second wire outlet 2424, through which a lead of the second magnet 232 passes and which allows outflow of a liquid from the second mounting cavity 242. Preferably, a second wire outlet 2424 is formed in a corner of the second annular groove 2423. Further preferably, the second air inlet 2421 is formed in a corner of the side wall of the second annular groove 2423 opposite to the second wire outlet 2424.

As can be understood by those skilled in the art, the first air inlet 2411 and the first wire outlet 2414 are respectively formed in two opposite corners of the first annular groove 2413, and the second air inlet 2421 and the second wire outlet 2424 are respectively formed in two opposite corners of the second annular groove 2423, such that an airflow can blow water or moisture in the first and second annular grooves 2413 and 2423 towards the first and second wire outlets 2414 and 2424 under the restriction of the first and second annular grooves 2413 and 2423, allowing quick discharge of the water or moisture from the first and second annular grooves 2413 and 2423.

Preferably, the height of the bottom surface of the first annular groove 2413 gradually decreases towards the first wire outlet 2414, such that a liquid in the first annular groove 2413 flows to the first wire outlet 2414 under its own gravity, and finally flows out of the first mounting cavity 241. Similarly, the height of the bottom surface of the second annular groove 2423 gradually decreases towards the second wire outlet 2424, such that a liquid in the second annular groove 2423 flows to the second wire outlet 2424 under the action of its own gravity, and finally flows out of the second mounting cavity 242.

Further preferably, a gap is provided between the bottom surface of the first annular groove 2413 and the bottom surface of the first magnet 231, to prevent the liquid in the first annular groove 2413 from soaking the first magnet 231 and to prevent the first magnet 231 from obstructing the flow of the liquid in the first annular groove 2413. Similarly, a gap is provided between the bottom surface of the second annular groove 2423 and the bottom surface of the second magnet 232, to prevent the liquid in the second annular groove 2423 from soaking the second magnet 232 and to prevent the second magnet 232 from obstructing the flow of the liquid in the second annular groove 2423.

Further, an included angle between each of the first and second wire outlets 2414 and 2424 and a horizontal plane has a value in a range of 0° to 45°, such that the first and second wire outlets 2414 and 2424 can also facilitate the passage of leads of the first and second magnets 231 and 232 while discharging the liquid in each of the first and second annular grooves 2413 and 2423.

Returning and still referring to FIG. 2, the thermal insulation plate 270 is provided with a water drain 271. Preferably, the water drain 271 is formed in the middle of the thermal insulation plate 270, and the height throughout the thermal insulation plate 270 gradually decreases towards the water drain 271, such that the liquid on the thermal insulation plate 270 can quickly converge at the water drain 271.

In some embodiments of the present invention, the first wire outlet 2414 leads to the outer side of the drawer container 210, such that the liquid flowing out of the first wire outlet 2414 flows along the outer surface of the side wall of the drawer container 210 onto the thermal insulation plate 270. Preferably, the outer surface of the side wall of the drawer container 210 is provided with a drainage groove for directing the liquid to flow to the thermal insulation plate 270. The second wire outlet 2424 points to the thermal insulation plate 270, such that the liquid flowing out of the second wire outlet 2424 flows directly onto the thermal insulation plate 270.

Still referring to FIG. 2, the water drain 271 is aligned with the water receiving container 280, such that water flowing out of the water drain 271 falls directly into the water receiving container 280.

In the present invention, the water receiving container 280 may be a separate structure arranged below the thermal insulation plate 270, for example a water receiving tray fixedly connected to the thermal insulation plate 270 or the drawer container 210; and the water receiving container 280 may also be part of an additional member. For example, the magnetic field fresh-keeping apparatus 200 further includes a housing, and the water receiving container 280 is part of the housing. Specifically, the water receiving container 280 is a sunken tank molded in the bottom wall of the housing. The water receiving container 280 may also be a pit formed in the bottom wall of an inner container of the storage compartment.

Optionally, the water receiving container 280 is connected to a drain pipe, through which a liquid in the water receiving container is discharged to the outside of the air-cooled refrigeration device.

Further optionally, a water level detection sensor and a switch are disposed at the water receiving container 280. The water level detection sensor is configured to detect a liquid level in the water receiving container 280, and the switch is configured to cut off the communication between the water receiving container 280 and the drain pipe. When the liquid level in the water receiving container 280 does not reach a set water level, the switch is turned off, and the liquid in the water receiving container 280 does not flow out; and when the liquid level in the water receiving container 280 reaches the set water level, the switch is turned on, and the liquid in the water receiving container 280 flows to the drain pipe.

In addition, in other embodiments of the present invention, those skilled in the art may also provide the thermal insulation plate at a top wall and/or left wall and/or right wall and/or back wall of the drawer container 210, as required.

The thermal insulation plate of the present invention may be a structure made of any feasible material such as foam and polyfoam.

Based on the foregoing description, it can be understood by a person skilled in the art that the magnetic field fresh-keeping apparatus 200 of the present invention can not only perform refrigeration on the magnet assembly 230, but also discharge condensate water produced in the refrigeration process in time, which prevents the magnet assembly 230 from being soaked and damaged by the condensate water. Moreover, the magnet assembly 230 of the present invention also improves the utilization rate of the magnetic fields and reduces the energy consumption.

So far, it should be appreciated by those skilled in the art that while various exemplary embodiments of the invention have been shown and described in detail herein, many other variations or modifications which are consistent with the principles of this invention may be determined or derived directly from the disclosure of the present invention without departing from the spirit and scope of the invention. Accordingly, the scope of the invention should be understood and interpreted to cover all such other variations or modifications.

What is claimed is:

1. A magnetic field fresh-keeping apparatus, comprising:
a drawer container, having an opening formed in a front side thereof;
a drawer, installed slidably into the drawer container;
a magnet assembly, comprising a first magnet and a second magnet, which are disposed on two opposite sides of the drawer container;
a magnet mounting cavity, comprising a first mounting cavity for arrangement of the first magnet and a second mounting cavity for arrangement of the second magnet, the first and second installation cavities both being disposed to allow passage of an airflow to cool the first and second magnets; and
a waterproof structure for protecting the magnet assembly from water;
wherein the first and second magnets are each an electromagnetic coil;
a bottom wall of the first mounting cavity is provided with a first wire outlet, through which a lead of the first magnet passes and which allows outflow of a liquid from the first mounting cavity; and
a bottom wall of the second mounting cavity is provided with a second wire outlet, through which a lead of the second magnet passes and which allows outflow of a liquid from the second mounting cavity.

2. The magnetic field fresh-keeping apparatus according to claim 1, wherein
the waterproof structure comprises a waterproof layer covering the electromagnetic coils.

3. The magnetic field fresh-keeping apparatus according to claim 2, wherein the electromagnetic coils are each a coil made of a wound enameled wire.

4. The magnetic field fresh-keeping apparatus according to claim 1, wherein
a first annular groove is formed in the first mounting cavity, the first magnet is installed in the first annular groove, and the first wire outlet is formed in a corner of the first annular groove; and/or
a second annular groove is formed in the second mounting cavity, the second magnet is installed in the second annular groove, and the second wire outlet is disposed at a corner of the second annular groove.

5. The magnetic field fresh-keeping apparatus according to claim 4, wherein
a first air inlet of the first mounting cavity is formed in a corner of the first annular groove opposite to the first wire outlet; and/or
a second air inlet of the second mounting cavity is formed in a corner of the second annular groove opposite to the second wire outlet; and/or
an included angle between each of the first and second wire outlets and a horizontal plane has a value in a range of 0° to 45°.

6. The magnetic field fresh-keeping apparatus according to claim 1, further comprising:

a thermal insulation plate, provided on a bottom side of the drawer container, wherein
the thermal insulation plate is provided with a water drain, and a height throughout the thermal insulation plate gradually decreases towards the water drain; and
the thermal insulation plate is configured to receive a liquid discharged from each of the first and second wire outlets.

7. The magnetic field fresh-keeping apparatus according to claim 6, further comprising:
a water receiving container, disposed below the drawer container, wherein the water receiving container is configured to receive a liquid falling from the water drain.

8. The magnetic field fresh-keeping apparatus according to claim 1, wherein
the magnetic field fresh-keeping apparatus comprises:
a top cover plate, disposed on a top side of the drawer container, the first mounting cavity being formed between the top cover plate and a top wall of the drawer container; and
a bottom cover plate, disposed on a bottom side of the drawer container, the second mounting cavity being formed between the bottom cover plate and a bottom wall of the drawer container;
and/or,
the magnet assembly further comprises:
a first magnetically conductive member, installed in the first mounting cavity and configured to prevent leakage of a magnetic field generated by the first magnet,
a second magnetically conductive member, installed in the second mounting cavity and configured to prevent leakage of a magnetic field generated by the second magnet, and
a magnetically conductive connecting member, disposed between the first magnetically conductive member and the second magnetically conductive member, the magnetically conductive connecting member being connected to the first magnetically conductive member and the second magnetically conductive member, respectively.

9. An air-cooled refrigeration device, comprising the magnetic field fresh-keeping apparatus according to claim 1, wherein the air-cooled refrigeration device can provide cold-blast air to the magnetic field fresh-keeping apparatus.

10. A magnetic field fresh-keeping apparatus, comprising:
a drawer container, having an opening formed in a front side thereof;
a drawer, installed slidably into the drawer container;
a magnet assembly, comprising a first magnet and a second magnet, which are disposed on two opposite sides of the drawer container;
a magnet mounting cavity, comprising a first mounting cavity for arrangement of the first magnet and a second mounting cavity for arrangement of the second magnet, the first and second installation cavities both being disposed to allow passage of an airflow to cool the first and second magnets; and
a waterproof structure for protecting the magnet assembly from water;
wherein the magnetic field fresh-keeping apparatus comprises:
a top cover plate, disposed on a top side of the drawer container, the first mounting cavity being formed between the top cover plate and a top wall of the drawer container; and a bottom cover plate, disposed on a bottom side of the
   drawer container, the second mounting cavity being
   formed between the bottom cover plate and a bottom
   wall of the drawer container;

and/or, the magnet assembly further comprises:

a first magnetically conductive member, installed in the
   first mounting cavity and configured to prevent leakage
   of a magnetic field generated by the first magnet, a second magnetically conductive member, installed in
   the second mounting cavity and configured to prevent
   leakage of a magnetic field generated by the second
   magnet, and a magnetically conductive connecting member, disposed
   between the first magnetically conductive member and
   the second magnetically conductive member, the mag-
   netically conductive connecting member being con-
   nected to the first magnetically conductive member and
   the second magnetically conductive member, respec-
   tively.

\* \* \* \* \*